(12) United States Patent
Wang et al.

(10) Patent No.: US 8,192,837 B2
(45) Date of Patent: Jun. 5, 2012

(54) ADHESIVE LAYER COMPOSITION FOR IN-MOLD DECORATION

(75) Inventors: Xiaojia Wang, Fremont, CA (US); Cheri Pereria, Fremont, CA (US); Pei-Lin Wang, San Jose, CA (US); Jing-Den Chen, San Jose, CA (US); Rong-Chang Liang, Cupertino, CA (US)

(73) Assignee: Etansi Inc., Taoyuan County (TW)

( * ) Notice: Subject to any disclaimer, the term of this patent is extended or adjusted under 35 U.S.C. 154(b) by 744 days.

(21) Appl. No.: 12/337,478

(22) Filed: Dec. 17, 2008

(65) Prior Publication Data

US 2009/0098362 A1    Apr. 16, 2009

Related U.S. Application Data

(63) Continuation of application No. 11/176,566, filed on Jul. 6, 2005, now abandoned.

(60) Provisional application No. 60/589,708, filed on Jul. 20, 2004.

(51) Int. Cl.
| | |
|---|---|
| A01K 1/015 | (2006.01) |
| B28B 7/22 | (2006.01) |
| B28B 7/36 | (2006.01) |
| B28B 7/38 | (2006.01) |
| B32B 5/16 | (2006.01) |
| B32B 7/12 | (2006.01) |
| B32B 15/04 | (2006.01) |
| B41B 11/54 | (2006.01) |
| B29C 33/56 | (2006.01) |
| B29C 41/32 | (2006.01) |
| B29C 45/14 | (2006.01) |
| B60C 1/00 | (2006.01) |
| C04B 28/14 | (2006.01) |
| C08F 8/00 | (2006.01) |
| C08F 8/30 | (2006.01) |
| C08F 283/04 | (2006.01) |
| C08F 290/04 | (2006.01) |
| C08G 18/08 | (2006.01) |
| C08G 63/48 | (2006.01) |
| C08G 63/91 | (2006.01) |
| C08J 3/02 | (2006.01) |
| C08K 3/20 | (2006.01) |
| C08K 3/26 | (2006.01) |
| C08K 3/30 | (2006.01) |
| C08K 3/34 | (2006.01) |
| C08K 3/40 | (2006.01) |
| C08K 9/00 | (2006.01) |
| C08K 9/04 | (2006.01) |
| C08L 51/00 | (2006.01) |
| C08L 75/00 | (2006.01) |
| C08L 83/00 | (2006.01) |
| C09B 67/00 | (2006.01) |
| C09C 1/42 | (2006.01) |
| C09D 5/02 | (2006.01) |
| C09D 17/00 | (2006.01) |
| C09K 19/00 | (2006.01) |

(52) U.S. Cl. ............... 428/327; 349/112; 349/114.1; 264/77; 264/255; 264/259; 264/338; 427/133; 428/1.1; 428/1.5; 428/221; 428/323; 428/355 R; 428/355 N; 428/355 EN; 428/355 AC; 523/201; 523/206; 523/207; 524/423; 524/425; 524/445; 524/447; 524/492; 524/493; 524/494; 524/501; 524/502; 524/504; 524/507; 525/55; 525/123; 525/455

(58) Field of Classification Search ............ 523/201, 523/206, 207; 524/423, 425, 445, 447, 492, 524/493, 494, 501, 502, 504, 507; 525/55, 525/123, 455; 249/112, 114.1; 264/77, 255, 264/259, 338; 427/133; 428/1.1, 221, 323, 428/327, 355 R, 355 N, 355 EN, 355 AC, 428/1.5

See application file for complete search history.

(56) References Cited

U.S. PATENT DOCUMENTS

| | | | |
|---|---|---|---|
| 4,465,728 A | 8/1984 | Haigh et al. | |
| 4,597,815 A | 7/1986 | Nakamura | |
| 4,885,271 A | 12/1989 | Kawakami et al. | |
| 5,102,497 A | 4/1992 | Hamaguchi et al. | |
| 5,409,754 A | 4/1995 | Yasuda et al. | |
| 5,795,527 A | 8/1998 | Nakamura et al. | |
| 5,935,692 A | 8/1999 | Smith | |
| 6,040,382 A * | 3/2000 | Hanes | 525/98 |
| 6,245,182 B1 | 6/2001 | Nakamura | |
| 6,326,086 B1 | 12/2001 | Mori et al. | |
| 6,417,253 B1 | 7/2002 | Shakhnovich | |
| 6,632,531 B2 * | 10/2003 | Blankenship | 428/402 |

(Continued)

FOREIGN PATENT DOCUMENTS

WO    WO 2005/002305    1/2005

(Continued)

OTHER PUBLICATIONS

Allen, K. (Oct. 2003). Electrophoretics Fulfilled. *Emerging Displays Review: Emerging Display Technologies*, Monthly Report—Oct. 2003, 9-14.

(Continued)

*Primary Examiner* — Patrick Niland
(74) *Attorney, Agent, or Firm* — Jianq Chyun IP Office

(57) ABSTRACT

This invention relates to compositions suitable for the formation of an adhesive layer used for in-mold decoration. This invention also relates to in-mold decoration tape or strip, comprising: a carrier layer; a release layer; a durable layer; and an adhesive layer which comprises an adhesive binder, a polymeric particulate material and an inorganic particulate material.

20 Claims, 1 Drawing Sheet

U.S. PATENT DOCUMENTS

| | | | |
|---|---|---|---|
| 6,634,291 B2 | 10/2003 | Huang | |
| 6,663,746 B2 | 12/2003 | Dornzek | |
| 6,689,474 B2 | 2/2004 | Pickett et al. | |
| 7,156,945 B2 | 1/2007 | Chaug et al. | |
| 7,401,758 B2 | 7/2008 | Liang et al. | |
| 2002/0040098 A1* | 4/2002 | Maekawa et al. | 525/88 |
| 2005/0163940 A1* | 7/2005 | Liang et al. | 428/1.1 |
| 2005/0171292 A1 | 8/2005 | Zang et al. | |
| 2005/0181204 A1 | 8/2005 | Wang et al. | |
| 2005/0255314 A1 | 11/2005 | Wang et al. | |
| 2006/0019088 A1 | 1/2006 | Wang et al. | |

FOREIGN PATENT DOCUMENTS

| | | |
|---|---|---|
| WO | WO 2005/028176 | 3/2005 |

OTHER PUBLICATIONS

Bardsley, J.N. & Pinnel, M.R. (Nov. 2004) Microcup™ Electrophoretic Displays. *USDC Flexible Display Report*, 3.1.2. pp. 3-12-3-16.

Chaug, Y.S., Haubrich, J.E., Sereda, M. and Liang, R.C. (Apr. 2004). Roll-to-Roll Processes for the Manufacturing of Patterned Conductive Electrodes on Flexible Substrates. *Mat. Res. Soc. Symp. Proc.*, vol. 814, I9.6.1.

Chen, S.M. (Jul. 2003) The Applications for the Revolutionary Electronic Paper Technology. *OPTO News & Letters*, 102, 37-41. (in Chinese, English abstract attached).

Chen, S.M. (May 2003) The New Applications and the Dynamics of Companies. *TRI*. 1-10. (in Chinese, English abstract attached).

Chung, J., Hou, J., Wang, W., Chu, L.Y., Yao, W., & Liang, R.C. (Dec. 2003). Microcup(R) Electrophoretic Displays, Grayscale and Color Rendition. *IDW*, AMD2/EP1-2, 243-246.

Ho, Andrew. (Nov. 2006) *Embedding e-Paper in Smart Cards, Pricing Labels & Indicators*. Presentation conducted at Smart Paper Conference Nov. 15-16, 2006, Atlanta, GA.

Ho, Candice. (Feb. 1, 2005) *Microcupt® Electronic Paper Device and Applicaiton*. Presentation conducted at USDC 4th Annual Flexible Display Conference 2005.

Ho, C.,& Liang, R.C. (Dec. 2003). *Microcup (R) Electronic Paper by Roll-to-Roll Manufacturing Processes*. Presentation conducted at FEG, Nei-Li, Taiwan.

Hou, J., Chen, Y., Li, Y., Weng, X., Li, H. and Pereira, C. (May 2004). Reliability and Performance of Flexible Electrophoretic Displays by Roll-to-Roll Manufacturing Processes. *SID Digest*, 32.3, 1066-1069.

Lee, H., & Liang, R.C. (Jun. 2003) SiPix Microcup(R) Electronic Paper—An Introduction. *Advanced Display*, Issue 37, 4-9 (in Chinese, English abstract attached).

Liang, R.C. (Feb. 2003) *Microcup(R) Electrophoretic and Liquid Crystal Displays by Roll-to-Roll Manufacturing Processes*. Presentation conducted at the Flexible Microelectronics & Displays Conference of U.S. Display Consortium, Phoenix, Arizona, USA.

Liang, R.C. (Apr. 2004). *Microcup Electronic Paper by Roll-to-Roll Manufacturing Process*. Presentation at the Flexible Displays & Electronics 2004 of Intertech, San Fransisco, California, USA.

Liang, R.C. (Oct. 2004) *Flexible and Roll-able Display/Electronic Paper—A Technology Overview*. Paper presented at the METS 2004 Conference in Taipie, Taiwan.

Liang, R.C., (Feb. 2005) *Flexible and Roll-able Displays/Electronic Paper—A Brief Technology Overview*. Flexible Display Forum, 2005, Taiwan.

Liang, R.C., Hou, J., Chung, J., Wang, X., Pereira, C., & Chen, Y. (2003). Microcup(R) Active and Passive Matrix Electrophoretic Displays by a Roll-to-Roll Manufacturing Processes. *SID Digest*, 20.1.

Liang, R.C., Hou, J., & Zang, H.M. (Dec. 2002) Microcup Electrophoretic Displays by Roll-to-Roll Manufacturing Processes. *IDW*, EP2-2, 1337-1340.

Liang, R.C., Hou, J., Zang, H.M., & Chung, J. (Feb. 2003). *Passive Matrix Microcup(R) Electrophoretic Displays*. Paper presented at the IDMC, Taipei, Taiwan.

Liang, R.C., Hou, J., Zang, H.M., Chung, J., & Tseng, S. (2003). Microcup(R) displays : Electronic Paper by Roll-to-Roll Manufacturing Processes. *Journal of the SID*, 11(4), 621-628.

Liang, R.C., Zang, H.M., Wang, X., Chung, J. & Lee, H., (Jun./Jul. 2004) <<Format Flexible Microcup (R) Electronic Paper by Roll-to-Roll Manufacturing Process>>, Presentation conducted at the 14th FPD Manufacturing Technology EXPO & Conference.

Liang, R.C., & Tseng, S. (Feb. 2003). *Microcup(R) LCD, An New Type of Dispersed LCD by a Roll-to-Roll Manufacturing Process*. Paper presented at the IDMC, Taipei, Taiwan.

Nikkei Microdevices. (Dec. 2002) Newly-Developed Color Electronic Paper Promises—Unbeatable Production Efficiency. *Nikkei Microdevices*, 3. (in Japanese, with English translation).

Wang, X., Kiluk, S., Chang, C., & Liang, R.C. (Feb. 2004). Mirocup (R) Electronic Paper and the Converting Processes. *ASID*, 10.1.2-26, 396-399, Nanjing, China.

Wang, X., Kiluk, S., Chang, C., & Liang, R.C., (Jun. 2004) Microcup® Electronic Paper and the Converting Processes. *Advanced Display*, Issue 43, 48-51.

Wang, X., Li, P., Sodhi, D., Xu, T. and Bruner, S. et al., (Feb. 2006) *Inkjet Fabrication of Multi-Color Microcup® Electrophorectic Display*. The Flexible Microelectronics & Displays Conference of U.S. Display Consortium.

Wang, X., Zang, HM., and Li, P. (Jun. 2006) Roll-to-Roll Manufacturing Process for Full Color Electrophoretic film. *SID Digest*, 00pp. 1587-1589.

Zang, H.M. (Feb. 2004). *Microcup Electronic Paper*. Presentation conducted at the Displays & Microelectronics Conference of U.S. Display Consortium, Phoenix, Arizona, USA.

Zang, H.M. (Oct. 2003). *Microcup (R) Electronic Paper by Roll-to-Roll Manufacturing Processes*. Presentation conducted at the Advisory Board Meeting, Bowling Green State University, Ohio, USA.

Zang, H.M.Hou, Jack, (Feb. 2005) *Flexible Microcup® EPD by RTR Process*. Presentation conducted at 2nd Annual Paper-Like Displays Conference, Feb. 9-11, 2005, St. Pete Beach, Florida.

Zang, H.M, Hwang, J.J., Gu, H., Hou, J., Weng, X., Chen, Y., et al. (Jan. 2004). Threshold and Grayscale Stability of Microcup (R) Electronic Paper. *Proceeding of SPIE-IS&T Electronic Imaging, SPIE* vol. 5289, 102-108.

Zang, H.M., & Liang, R.C. (2003) Microcup Electronic Paper by Roll-to-Roll Manufacturing Processes. *The Spectrum*, 16(2), 16-21.

Zang, HM., (Sep. 2006) *Monochrome and Area Color Microcup® EPDs by Roll-to-Roll Manufacturing Process*. Presentation conducted at the Forth Organic Electronics Conference and Exhibition (OEC-06), Sep. 25-27, 2006, Frankfurt, Germany.

Zang, HM., Wang, W., Sun, C., Gu, H., and Chen, Y. (May 2006) Monochrome and Area Color Microcup® EPDs by Roll-to-Roll Manufacturing Processes. *ICIS '06 International Congress of Imaging Science Final Program and Proceedings*, pp. 362-365.

Zang, Hongmei. (Feb. 2007) *Developms in Microcup® Flexible Displays*. Presidentaiton conducted at the 6th Annual Flexible Display and Microelectronics Conference, Phoenix, AZ Feb. 6-8.

\* cited by examiner

ADHESIVE LAYER COMPOSITION FOR IN-MOLD DECORATION

This application is a continuation of U.S. application Ser. No. 11/176,566, filed Jul. 6, 2005, now abandoned which claims the benefit of U.S. Provisional Application No. 60/589,708, filed Jul. 20, 2004. The contents of the priority applications are incorporated herein by reference in their entirety.

FIELD OF THE INVENTION

This invention relates to compositions suitable for the formation of an adhesive layer used for in-mold decoration.

BACKGROUND OF THE INVENTION

In-mold decoration processes involve decorating objects as they are formed, in mold, of a heated plastic material being injected into a mold cavity. Usually a tape or strip of a decorating or protective material is automatically or manually advanced, pre-fed and positioned in the mold cavity at each molding cycle, interfacing therein with the plastic material as it is filled into the mold cavity, under heat and pressure. As the object is formed, the decorating material forms on the surface of the object and becomes an integral and permanent part of the object, through thermal transfer in the in-mold decoration process. Other molding processes such as thermal forming, blow molding and compression molding or stamping may also be used for the transfer of the decorating or protective material. Sometimes the process may also be called in-mold labeling or in-mold coating, and the transferable protective material may be called a thermal transfer overcoat or durable coat layer.

The decoration tape or strip usually comprises a carrier layer, a release layer, a durable layer, an adhesive or tie-coat layer and also a layer of decorative designs (metal or ink). After the injection molding transfer, the carrier layer and the release layer are removed, leaving the durable layer as the outmost layer. The durable layer serves as a protective layer with scratch resistance, mar or abrasion resistance and solvent resistance to protect the decorative designs and also the molded object. The adhesive layer is incorporated into the decoration tape or strip to provide optimum adhesion of the decoration tape or strip to the top surface of the molded object.

However, the currently available decoration tape or strip has many disadvantages. For example, when the carrier and release layers are removed, the durable layer cannot be cleanly separated from the release layer, especially at the edges of the molded object. The residual durable layer at the edges has to be removed manually. As a result, fragments of the residual durable layer inevitably generate debris which not only causes contamination to the production environment but also reduces the production yield. This problem is even more pronounced when the molded object has a small hollow structure, such as a speaker and ear pieces of a cell phone cover.

The problem is most likely caused by poor fracture characteristics of the decoration tape or strip and/or the inappropriate balance between the cohesion strength of the durable and adhesive layers and the adhesion strength at the interface between, such as the durable and release layers, the durable and ink layers, the durable and metal layers, the adhesive and metal layers, the durable and adhesive layers and/or the adhesive layer and the molding plastic material.

SUMMARY OF THE INVENTION

The first aspect of the present invention is directed to an improved adhesive layer of a decoration tape or strip or a thermal transfer printing or coating layer. The improved adhesive layer is coated on a decorative layer or a functional coating and/or printing layer to facilitate the transfer of the decoration or functional coating and/or printing onto an object of interest by heat, pressure or a combination thereof. The transfer may be accomplished by a method such as injection molding, hot stamping, heat laminator or thermal head printing.

The adhesive layer comprises an adhesive binder and a polymeric particulate material. The polymeric particulate material has a Tg (glass transition temperature) higher than about 45° C., preferably higher than about 55° C. and more preferably higher than about 65° C. The concentration of the polymeric particulate material is preferably in the range of about 5 to about 50% by weight, more preferably in the range of about 10 to about 40% by weight. The polymeric particulate material is dispersed in the adhesive binder and preferably remains in a dispersed state during the thermal transfer process.

The polymeric particulate material is preferably of small particles having an average size of < about 1 um, more preferably < about 0.2 um and most preferably < about 0.15 um and is immiscible with the adhesive binder.

In the context of the present invention, two materials are "miscible" if they form a single phase or a material of a single Tg, after the two are thoroughly blended by heat, solvent or mechanical means.

The second aspect of the present invention is directed to an adhesive layer of the present invention wherein said polymeric particulate material is refractive index matched to the adhesive binder. The difference between the refractive indexes of the two materials is preferably less than about 0.1, more preferably less than about 0.05.

The third aspect of the present invention is directed to an adhesive layer of the present invention wherein said polymeric particulate material is core-shell particles having a high Tg shell that is at least partially miscible with the adhesive binder. The Tg of the shell is higher than about 45° C., preferably higher than about 55° C. and more preferably higher than about 65° C. Preferably the core is refractive index matched to the shell or the blend of the shell and the adhesive binder.

The fourth aspect of the present invention is directed to an adhesive layer of the present invention further comprising about 1 to about 20% by weight, preferably about 3 to about 15% by weight, of an inorganic particulate material having an average particle size of less than about 0.2 um, preferably less than about 0.1 um and more preferably less than about 0.05 um.

The fifth aspect of the present invention is directed to an adhesive layer of the present invention further comprising about 0.2 to about 5% by weight, preferably about 1 to about 3% by weight, of an organic or inorganic particulate material having an average particle size in the range of about 0.5 to about 6 um, preferably in the range of about 1 to about 3 um.

The sixth aspect of the present invention is direct to an adhesive layer of the present invention comprising an adhesive binder, an organic or a first inorganic particulate material having an average particle size in the range of about 0.5 to about 6 um, preferably in the range of about 1 to about 3 um, and a second inorganic particulate material having an average particle size smaller than about 0.2 um, preferably smaller than about 0.1 um and more preferably smaller than about 0.05 um. The total concentration of the inorganic particulate material(s) is preferably about 5 to about 50% by weight, preferably about 10 to about 35% by weight.

In one embodiment of this aspect of the invention, the adhesive layer may comprise an adhesive binder, a polymeric particulate material, a first inorganic particulate material having an average particle size of larger than about 0.5 to about 6 um, preferably larger than about 1 to about 3 um, and a second inorganic particulate material having an average particle size smaller than about 0.2 um, preferably smaller than about 0.1 um and more preferably smaller than about 0.05 um. The concentration of the polymeric particulate material is preferably in the range of about 5 to about 50% by weight, more preferably in the range of about 10 to about 40% by weight. The polymeric particulate material is preferably small particles having an average size of < about 1 um, preferably < about 0.2 um and more preferably < about 0.15 um.

The seventh aspect of the present invention is direct to an adhesive layer of the present invention further comprising a solid plasticizer having a melting point between about 65 to about 130° C., preferably between about 80 to about 115° C. For example, the adhesive layer may comprise an adhesive binder, a polymeric particulate material and a solid plasticizer.

The adhesive layer of the present invention provides desirable fracture properties and as a result, cracking at the edges of the object during the transfer process such as injection molding, may be initiated and propagated efficiently during the injection molding process and the subsequent mold-part separation process. This feature enables a clean separation of the decoration or functional layer from the carrier substrate at the edges of the object, particularly at the edges of a hollow structure.

In addition, the adhesive layer of the present invention also provides high degree of transmission, high blocking resistance, high hardness and sufficient adhesion, even for complicated three-dimensional objects.

DETAILED DESCRIPTION OF THE INVENTION

Figure 1:
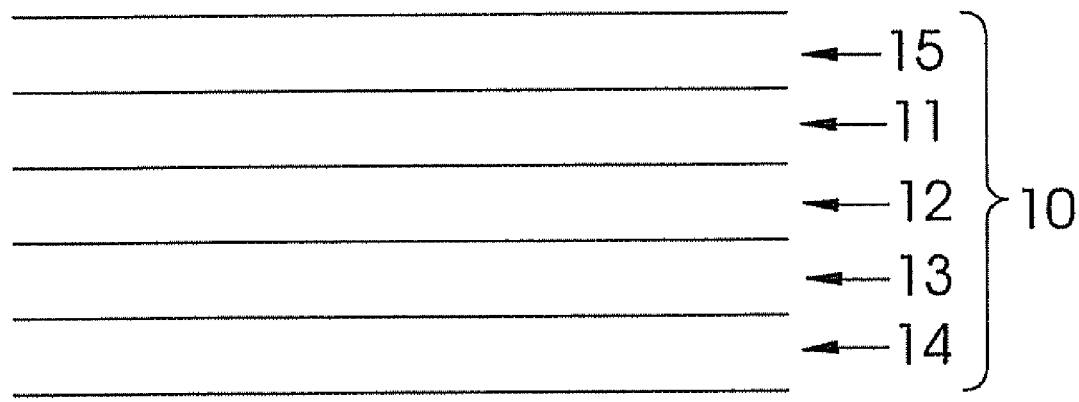
FIG. 1 is a cross section view of an in-mold decoration tape or strip.

FIG. 1 is a cross-section view of an in-mold decoration tape or strip (10) which comprises a carrier layer (15), a release layer (11), a durable layer (12), a decorative design layer (13), and an adhesive layer (14).

Figure 2:
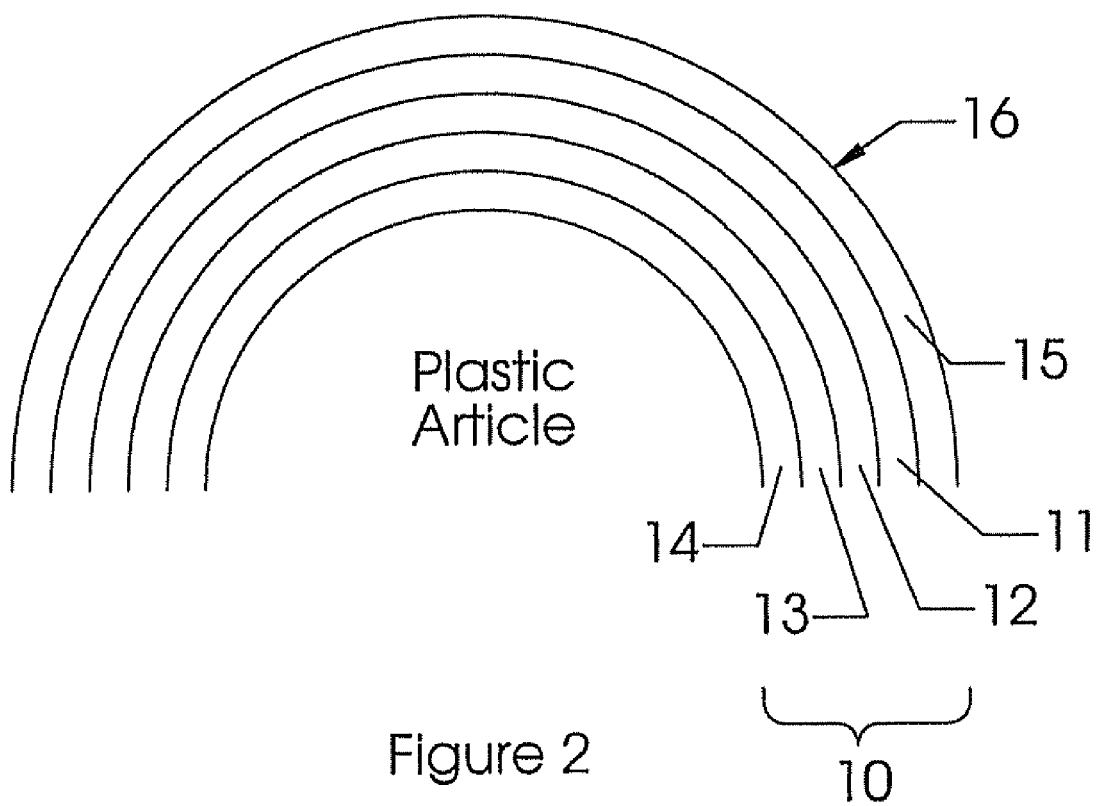
FIG. 2 shows how the in-mold decoration tape or strip is fed into a mold cavity.

In an in-mold decoration process, the tape or strip (10) is fed into a mold cavity (16) automatically or manually with the carrier layer (15) in contact with the mold surface as shown in FIG. 2. The tape or strip may be thermally formed to a desirable shape before the feeding step.

The carrier (15), release (11) and durable (12) layers may be formed by methods known in the art and all of the previously known carrier, release and durable layers may be incorporated into the present invention.

For example, the carrier layer (15) usually is a thin plastic film with a thickness from about 3.5 to about 100 microns, preferably about 10 to about 50 microns. Polyethylene terephthalate (PET), polyethylene naphthate (PEN) or polycarbonate (PC) film is particularly preferred because of their low cost, high transparency and thermomechanical stability.

The release layer (11) allows the in-mold decoration tape or strip to be released from the carrier layer in a manner that minimizes damage to the durable layer (12) and the decorative layer (13) and also enables a fully automated roll transfer process during molding. The release layer usually is a low surface tension coating prepared from a material such as wax, paraffin or silicone or a highly smooth and impermeable coating prepared from a material selected from the group consisting of melamine formaldehyde, metal thin film such as Al or Sn, crosslinked polyacrylates, silicone acrylates, epoxides, vinyl esters, vinyl ethers, allyls and vinyls, unsaturated polyesters or blends thereof. The release layer may comprise a condensation polymer, copolymer, blend or composite selected from the group consisting of epoxy, polyurethane, polyimide, polyamide, melamine formaldehyde, urea formaldehyde, phenol formaldehyde and the like.

The release layer as disclosed in U.S. Ser. No. 60/564,018 filed on Apr. 20, 2004, the content of which is incorporated herein by reference in its entirety, is also suitable. Such a release layer composition comprises an amine-aldehyde condensate and a radical inhibitor or quencher.

The durable layer (12) serves as a protective layer for the decorative layer. Suitable raw materials for the durable coating may include, but are not limited to, radiation curable multifunctional acrylates including epoxy acrylates, polyurethane acrylates, polyester acrylates, silicone acrylates, glycidyl acrylates, epoxides, vinyl esters, diallyl phthalate, vinyl ethers and blends thereof. The durable layer may comprise a condensation polymer or copolymer, such as epoxy, polyurethane, polyamide, polyimide, melamine formaldehyde, urea formaldehyde or phenol formaldehyde. The durable layer may also comprise a sol-gel silicate or titanium ester.

The durable layer may be partially or fully cured. If partially cured, a post curing step will be employed after the molding and/or transferring step to enhance the durability, particularly hardness, scratch and oil resistance.

To improve the release properties, the raw material, particularly the low molecular weight components of the durable layer, is preferably not permeable into the release layer. After the durable layer is coated and cured or partially cured, it should be marginally compatible or incompatible with the release layer. Binders and additives, such as thickeners, surfactants, dispersants, UV stabilizers or antioxidants, may be used to control the rheology, wettability, coating properties, weatherability and aging properties. Fillers such as silica, $Al_2O_3$, $TiO_2$, $CaCO_3$, microcrystalline wax or polyethylene, Teflon or other lubricating particles may also be added to improve, for example, scratch resistance and hardness of the durable layer.

The durable layers as disclosed in U.S. Ser. No. 60/532,003 filed on Dec. 22, 2003, U.S. Ser. No. 60/563,997 filed on Apr. 20, 2004 and U.S. Ser. No. 60/541,797 filed on Feb. 3, 2004, the contents of all of which are incorporated herein by reference in their entirety, are also suitable.

The durable layer is usually about 2 to about 20 microns, preferably about 3 to about 8 microns in thickness.

The decorative layer (13) may be a metallic layer or an ink layer formed from a method such as vapor deposition or sputtering, optionally followed by a patterning process. The ink pattern may be formed by a printing process such as gravure, flexo, screen, sublimation heat transfer or the like on a substrate layer. The substrate layer may be a plastic layer or an insulator-coated metal or metal oxide foil formed from carbon steel, stainless steel, Al, Sn, Ni, Cu, Zn, Mg or an alloy or oxide thereof.

The decorative designs may also be pre-shaped by thermoforming. In this case, the carrier layer (15) becomes part of the molded object. The decorative layer having raised or recessed patterns is typically in the range of about 0.2 to about 1 mm, preferably in the range of about 0.3 to about 0.7 mm, in thickness. It is usually thermoformed from an ABS (acrylonitril-butadiene-styrene), polycarbonate, acrylics, polystyrene or PVC sheet in a mold.

Alternatively, the decorative layer may be also pre-shaped by high pressure forming involving the use of high-pressure air to create decorative designs on a film. The decorative layer may also be formed by hydroforming in which a hydrostatic bladder, rather than air, serves as the forming mechanism.

The adhesive layer (14) disclosed herein constitutes the present invention. The adhesive layer comprises an adhesive binder and a polymeric particulate material.

In the context of the present invention, suitable adhesive binders may include, but are not limited to, polyurethane, acrylics, SBR (styrene-butadiene rubber), polybutadiene, polyamides, pyrrolidone copolymers, oxazolidone copolymers, vinylidene chloride copolymers, vinylacetate copolymers such as EVA (ethylene-vinylacetate or vinyl alcohol copolymers), polyesters and derivatives or blends thereof, with polyurethane, acrylics or hybrids thereof as preferred. Latex adhesive binders or hydrocarbon dispersion adhesives are more preferred since they generally provide a wider process window for coating onto the durable layer of a decoration tape or strip or thermal transfer coating.

In one embodiment, the adhesive binder is formed from a film forming polyurethane latex. To facilitate the film formation of the adhesive binder, a fugitive coalescing solvent, such as toluene, xylene, ethyl acetate, butyl acetate, methyl ethyl ketone, acetone or N-methyl pyrrolidone, may be added.

The melt flow temperature or the thermal activation temperature of the adhesive binder which is the continuous phase of the adhesive layer is preferably lower than the injection molding temperature or the transfer printing temperature. Preferably the thermal activation temperature is lower than about 200° C., preferably lower than about 170° C. and more preferably lower than about 140° C.

The adhesive binder may take up about 40% to about 90%, preferably about 50% to about 85% and more preferably about 60% to about 75% by weight, of the adhesive layer.

The polymeric particulate material preferably has a Tg (glass transition temperature) higher than about 45° C., preferably higher than about 55° C. and more preferably higher than about 65° C. The polymeric particulate material is dispersed in the adhesive binder and preferably remains in a dispersed state during the thermal transfer process.

The average particle size of the polymeric particulate material is preferably less than about 1 um, more preferably less than about 0.2 um and most preferably less than about 0.15 um.

In the context of the present invention, the polymeric particulate material may be a dispersion or latex prepared by emulsion polymerization, dispersion polymerization, direct or inverse emulsification, followed by chain extension or interfacial polymerization from a monomer such as acrylates, methacrylates, styrenes or other vinyl monomers, multifunctional isocyanates and polyols, multifunctional acid chlorides or anhydrides and polyamines or polyols, and the like.

The concentration of the polymeric particulate material is preferably in the range of about 5 to about 50% by weight, more preferably in the range of about 10 to about 40% by weight.

In another aspect of the present invention, the adhesive layer comprises a polymeric particulate material that is refractive index matched to the adhesive binder. The difference between the refractive indexes of the two materials is preferably less than about 0.1, more preferably less than about 0.05.

A further aspect of the invention is directed to an adhesive layer wherein said polymeric particulate material is core-shell particles. Each of the core-shell particles has a shell which is at least partially miscible with the adhesive binder. In one embodiment, the Tg of the shell is higher than about 45° C., preferably higher than about 55° C. and more preferably higher than about 65° C. Preferably the core is refractive index matched to the shell or the blend of the shell and the adhesive binder.

The core-shell particles may be prepared by, for example, emulsion polymerization with step-wise addition of monomers.

In addition to the adhesive binder and the polymeric particulate material, the adhesive layer may further comprise an inorganic particulate material. In the context of the present invention, the inorganic particulate material may be $CaCO_3$, $BaSO_4$, silica, glass beads, bentonite, clay or the like.

In another aspect of the present invention, the adhesive layer may further comprise about 1 to about 20% by weight, preferably about 3 to about 15% by weight, of an inorganic particulate material. The inorganic particulate material may have an average particle size of less than about 0.2 um, preferably less than about 0.1 um and more preferably less than about 0.05 um.

Another aspect of the present invention is directed to an adhesive layer of the present invention further comprising about 0.2 to about 5% by weight, preferably about 1 to about 3% by weight, of an organic or inorganic particulate material. The organic or inorganic particulate material may have an average particle size in the range of about 0.5 to about 6 um, preferably in the range of about 1 to about 3 um.

A further aspect of the present invention is direct to an adhesive layer of the present invention comprising an adhesive binder, an organic or a first inorganic particulate material having an average particle size in the range of about 0.5 to about 6 um, preferably in the range of about 1 to about 3 um, and a second inorganic particulate material having an average particle size smaller than about 0.2 um, preferably smaller than about 0.1 um and more preferably smaller than about 0.05 um. The total concentration of the inorganic particulate material(s) is preferably about 5 to about 50% by weight, preferably about 10 to about 35% by weight.

In the context of the present invention, the organic particulate material may be a latex material, organic crystals or a solid plasticizer as described below.

In one embodiment of this aspect of the invention, the adhesive layer may comprise an adhesive binder, a polymeric particulate material, a first inorganic particulate material having an average particle size of larger than about 0.5 to about 6 um, preferably larger than about 1 to about 3 um, and a second inorganic particulate material having an average particle size smaller than about 0.2 um, preferably smaller than about 0.1 um and more preferably smaller than about 0.05 um. The total concentration of the inorganic particulate materials is preferably about 5 to about 50% by weight, preferably about 10 to about 35% by weight. The concentration of the polymeric particulate material is preferably in the range of about 5 to about 50% by weight, more preferably in the range of about 10 to about 40% by weight. The polymeric particulate material is preferably small particles having an average size of < about 1 um, preferably < about 0.2 um and more preferably < about 0.15 um.

In another aspect of the present invention, the adhesive layer may comprise a solid plasticizer having a melting temperature between about 65° C. to about 130° C., preferably between about 80° C. to about 115° C. Examples of such solid plasticizers may include, but are not limited to, BHT (2,6-di-t-butyl-4-methylphenol), thiodiethylene hydrocinnamate (IRGANOX™ 1035 from Ciba-Geigy Corp.), tetrakis hindered phenol such as IRGANOX™ 1010 from Ciba Geigy Corp., dicyclohexyl phthalate, diphenyl phthalate, ethylene glycol dibenzoate, 2,2'-dihydroxy-4-methoxybenzophenone, 2,2'-dihydroxy-4-methoxybenzophenone, diphenyl oxalate, benzyl oxynaphthalene, 1-hydroxy-2-naphthoate, rosin and m-terphenyl derivatives, as well as many of the heat meltable crystalline compounds disclosed in U.S. Pat. No. 4,885,271, the content of which is incorporated herein by reference in its entirety.

The solid plasticizer may have an average particle size between about 0.05 microns to about 5 microns, preferably between 0.1 microns to about 3 microns. The solid plasticizer may take up between about 1% to about 10%, preferably about 2% to about 8% by weight, of the adhesive layer composition.

The components of the adhesive layer may be dispersed in a suitable carrier solvent or solvent mixture that does not attack the underlying layers during coating and drying. Water and hydrocarbon solvents (such as naphtha and toluene, etc.) are the preferred carriers for the adhesive composition, with water as the most preferred.

In the formation of the in-mold decorative tape or strip (10), the release layer (11), the durable layer (12), the decorative design layer (13) and the adhesive layer (14) of the present invention are sequentially coated or laminated onto the carrier layer (15). The lamination or coating may be accomplished by a coating method such as slot coating, doctor blade coating, gravure coating, roll coating, comma coating, lip coating, vacuum deposition, sputtering or the like or a printing method such as gravure printing, screen printing, flexo printing, lithographic printing, driographic printing or the like.

The durable layer and release layer may be thermal cured during the drying of the durable layer coating step, optionally with a post cure step after the coating. The thermal cure can be carried out at about 50° C. to about 120° C. for various lengths of time, for example, tenths of minute to hours, depending on the curing conditions and the composition.

To further improve the physicomechanical properties, the decoration or functional film may be further UV cured after the injection molding process when it has been transferred to the surface of the molded object. The molded object is placed on a UV conveyor that is running at, for example, 0.6 ft/min to 10 ft/min. The UV curing energy needed is usually in the range of from about 0.1 to about 5 J/cm$^2$, preferably about 0.3 to about 1.2 J/cm$^2$.

The adhesive layer of the present invention provides desirable fracture properties and as a result, cracking at the edges of the object during the transfer process, such as injection molding, may be initiated and propagated efficiently during the injection molding process and the subsequent mold-part separation process. This feature enables a clean separation of the decoration or functional layer from the carrier substrate at the edges of the object, particularly at the edges of a hollow structure.

In addition, the adhesive layer of the present invention also provides high degree of transmission, high blocking resistance, high hardness and sufficient adhesion, even for complicated three-dimensional objects.

The adhesive layer of the present invention is suitable for all in-mold decoration processes for the manufacture of a plastic object. Examples of the material suitable for the object may include, but are not limited to, thermoplastic materials such as polystyrene, polyvinyl chloride, acrylics, polysulfone, polyarylester, polypropylene oxide, polyolefins, acrylonitrile-butadiene-styrene copolymers (ABS), methacrylate-acrylonitrile-butadiene-styrene copolymers (MABS), polycarbonate, polybutylene terephthalate (PBT), polyethylene terephthalate (PET), polyurethanes and other thermoplastic elastomers or blends thereof, and thermoset materials such as reaction injection molding grade polyurethanes, epoxy resin, unsaturated polyesters, vinylesters or composites, prepregs and blends thereof.

The object may be a plastic cover of a cell phone or pager. In fact, the adhesive layer is useful for any plastic objects manufactured from an in-mold decoration process, such as personal accessories, toys or educational devices, plastic cover of a personal digital assistant or e-book, credit or smart cards, identification or business cards, face of an album, watch, clock, radio or camera, dashboard in an automobile, household items, laptop computer housings and carrying cases or front control panels of any consumer electronic equipments. This is clearly not exhaustive. Other suitable plastic objects would be clear to a person skilled in the art and therefore they are all encompassed within the scope of the present invention. The adhesive layer of the present invention is also useful in applications such as the thermal transfer protective coating for thermal printing, inkjet printing and passport and other identification applications.

EXAMPLES

Example 1

A release fluid was prepared first by mixing 2.10 gm of MF370 (methylated melamine resin, Cytec Industries) with 1.41 gm of ethylene glycol dimethyl ether (Aldrich) and 0.63 gm of DI water using a magnetic stirrer, after which 0.6 gm of 2,2'-dihydroxy-4-methoxybenzophenone (Aldrich), 0.06 gm of Silwet L7230/SL7607 (3/1 weight ratio, from Osi Specialties, Inc.) and 0.2 gm of Cycat 4040 (p-toluene sulfonic acid, from Cytec Industry) were added with agitation to ensure a homogeneous solution. This release fluid was then coated on a 1.5 mil PET film (PT1 from Mitsubishi Interfilm Holding, Inc., Easley, S.C.) with a #6.5 rod and a target dry coating thickness of 1.5 um. The coating was then placed in a 120° C. oven for 5 minutes to form a release coating.

A durable layer composition consisting of 7.67 gm (15% in MEK) of CAB-553-0.4 (cellulose acetate butyrate, from Eastman Chemical Co.), 2.94 gm (50% in MEK) of Ebecryl 1290 (aliphatic polyurethane acrylate, UCB Chemicals), 1.2 gm (30% in MEK) of MEK-ST (a silica dispersion from Nissan Chemicals), 0.40 gm of (25% in MEK) 1:1 w % ratio of triethanolamine and poly-Q (aminated tetrol from Arch Chemicals, Norwalk, Conn.), 0.43 gm of a photoinitiator (PI) solution containing 1.5% of BMS (4-(p-tolylthio)benzophenone, Aldrich, Milwaukee, Wis.), 0.8% of Irgacure 651 (2,2-dimethoxy-1,2-diphenylethane, Ciba Speciality Chemicals, Tarrytown, N.Y.), 0.15% of ITX (isopropyl thioxanthone, Aldrich, Milwaukee, Wis.), 0.2% of DBTDL (dibutyltin dilaurate, Aldrich, Milwaukee, Wis.), 0.1% of Irganox 1035 (thiodiethylene bis[3-(3,5-di-tert-butyl-4-hydroxyphenyl) propionate], Ciba Speciality Chemicals, Tarrytown, N.Y.) and 0.2% of Tinuvin 123 [decanedioic acid, bis(2,2,6,6-tetramethyl-1-(octyloxy)-4-piperidinyl)ester, reaction products with 1,1-dimethylethylhydroperoxide and octane from Ciba Speciality Chemicals, Tarrytown, N.Y.] in MEK, was prepared. The composition was overcoated onto the release layer prepared above using a #28 Meyer bar with a target thickness of about 7 um and dried at 70° C. for 20 minutes. The dried durable coating was then exposed to 0.4 J/cm2 UV irradiation.

Before preparing an adhesive composition of the present invention, the pH of each of the materials used was adjusted to 7.5 with either a diluted ammonia solution or a diluted sulfuric acid solution. The adhesive composition was then prepared by mixing 6.947 gm of S-2725 (water borne polyurethane) of a 40% solid content (from Neveon), 8.154 gm of AquaPress ME of a 39% solid content (from Proell Inc) and 9.611 gm of DI water together.

To the mixture, 2.897 gm of S-60 (silica nanoparticles) of a solid content of 29% (Nissan Chemical Houston Corporation) and 2.391 gm of NeoCryl A-550 (water borne acrylic resin) of a solid content of 27.6% (Tg=100° C., from Neo-Resins) were added in sequence with agitation.

The adhesive composition was then coated onto the durable layer prepared above with a #11 wired rod and dried in an 80° C. oven for 10 minutes. The adhesive coating thickness was targeted at ~3 um.

The film sample was then tested using a direct injection molding method with PMMA resin ZKM (from CYRO Industries) at 480° F.

Example 2

Comparative Example 8.154 Grams of AquaPress ME and 7.74 gm of DI water were mixed together. The resulting mixture was coated onto the durable layer prepared in Example 1 and dried in an 80° C. oven for 10 minutes. The film sample was then tested using a direct injection molding method with PMMA resin ZKM (from CYRO Industries) at 480° F.

TABLE 1

| | Adhesion | Lens Edge Cleanness | Transparency of the Lens | Film Blocking at 40° C./90% RH & 60 Hours |
|---|---|---|---|---|
| Example 1 | good | excellent | excellent | pass |
| Example 2 (Comparative Example) | good | 90% film remaining with the lens | excellent | fail |

Examples 3-5

The Use of Organic Particles with Different Tgs

In these examples, the pH values of all the materials used were pre-adjusted to 8.5 prior to mixing.

1.303 Grams of S-2725 (water borne polyurethane) of a 19% solid content (from Neveon), 4.523 gm of AquaPress ME of a 39% solid content (from Proell Inc) and 7.0 gm of DI water were mixed together. To this mixture, 0.84 gm of S-50 (silica nanoparticles) of a solid content of 29% (from Nissan Chemical Houston Corporation) was added, followed by adding 1.15 gm of B-85 (non-crosslinking acrylic emulsion) of a 31.3% solid content (Tg=73° C., Rohm & Haas) with agitation (in Example 3). In Example 4, 1.125 gm of NeoCryl A-6015 (acrylic emulsion) of a 32% solid content (Tg=63° C., NeoResins) was added. In Example 5, 0.818 gm of CL-106 (acrylic resin) of a 44% solid content (Tg=46° C., Rohm & Haas) was added. An additional 0.184 gm, 0.209 gm and 0.516 gm of water were added into Formulations of Example 3, Example 4 and Example 5, respectively, to make up a total solid content of 20%. The adhesive solution was then coated on the durable layer prepared in Example 1 with a #11 wired rod and dried in an 80° C. oven for 10 minutes. The adhesive coating thickness was targeted at ~3 um.

The film samples were then tested using a direct injection molding method with PMMA resin ZKM (from CYRO Industries) at 480° F. The resultant lens showed clean edges.

Example 6

The Use of Organic Particles with Two Different Inorganic Particles ($CaCO_3$ and Silica) and a Solid Plasticizer Socal S31 ($CaCO_3$) was ground to an average particle size of 0.3 um using Zirconium beads, Triton X-100 (Aldrich) and Tamol 731A (from Rohm Haas) at 12° C.

A solid plasticizer, 1,2-diphenoxyethane (melting temperature of 95° C.), was ground in the presence of a wetting agent, Triton X100, and a dispersing agent, Tamol 731A. The grinding temperature was 4° C. and grinding time was 14 hours. The particle size under microscope was about 1 to 2 um and the solution pH was 8.4.

0.928 Grams of S-2725 (water borne polyurethane) of a 40% solid content (from Neveon) was mixed with 2.22 gm of AquaPress ME of a 39% solid content (from Proell Inc) and 2.831 gm of DI water. To this mixture, 0.5 gm of S-50 (silica nanoparticles) of a 40% solid content (Nissan Chemical Houston Corporation), 1.206 gm of a $CaCO_3$ dispersion of a 31.1% solid content prepared above and 0.791 grams of the solid plasticizer dispersion of a 15.8% solid content prepared above, were added. The mixture was vortexed for 2 minutes. To this mixture, 5.876 gm of NeoCryl A-550 (water borne acrylic resin) of a 9.57% solid content (NeoResins) was added and the fluid was vortexed for 2 additional minutes. The adhesive solution was then coated on the durable layer prepared according to Example 1 with a #11 wired rod and dried in an 80° C. oven for 10 minutes. The adhesive coating thickness was targeted at ~3 um.

The film sample was then tested using a direct injection molding method with PMMA resin ZKM (from CYRO Industries) at 480° F. The resulted lens had clean edges.

Example 7

Comparative Example

The use of organic particles and a solid plasticizer without inorganic particles was tested.

1.312 Grams of S-2725 (water borne polyurethane) of a 40% solid content (from Neveon) was mixed with 3.14 gm of AquaPress ME of a 39% solid content (from Proell Inc) and 1.38 gm of DI water. To this mixture, 0.791 gm of the solid plasticizer dispersion of a 15.8% solid content prepared in Example 6 was added. The mixture was vortexed for 2 minutes. 5.876 Grams of NeoCryl A-550 (water borne acrylic resin) of a 10.64% solid content (NeoResins) was added and the fluid was vortexed for 2 additional minutes. The adhesive solution was coated on the durable layer prepared according to Example 1 with a #11 wired rod and dried in an 80° C. oven for 10 minutes. The adhesive coating thickness was targeted at ~3 um.

The film sample was then tested using a direct injection molding method with PMMA resin ZKM (from CYRO Industries) at 480° F. The lens formed had only 20% edge film removed.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective and scope of the present invention. All such modifications are intended to be within the scope of the claims appended hereto.

What is claimed is:

1. An in-mold decoration tape or strip, comprising:
    i) a carrier layer;
    ii) a release layer;
    iii) a durable layer; and
    iv) an adhesive layer which comprises an adhesive binder, a polymeric particulate material and an inorganic particulate material, wherein said polymeric particulate material is core-shell particles.

2. The tape or strip of claim 1, wherein said adhesive binder is selected from the group consisting of polyurethane, acrylics, styrene-butadiene rubber, polybutadiene, polyamides, pyrrolidone copolymers, oxazolidone copolymers, vinylidene chloride copolymers, vinylacetate copolymers, polyesters, and derivatives or blends thereof.

3. The tape or strip of claim 1, wherein said adhesive binder is a polyurethane, acrylic, or a hybrid thereof.

4. The tape or strip of claim 1, wherein said adhesive binder is a latex adhesive binder or a hydrocarbon dispersion adhesive.

5. The tape or strip of claim 1, wherein said adhesive binder takes up about 40% to about 90% by weight of the adhesive layer.

6. The tape or strip of claim 1, wherein said polymeric particulate material has a glass transition temperature higher than about 45.degree. C.

7. The tape or strip of claim 1, wherein said polymeric particulate material takes up about 5 to about 50% by weight of the adhesive layer.

8. The tape or strip of claim 1, wherein said polymeric particulate material is refractive index matched to said adhesive binder.

9. The tape or strip of claim 1, wherein the difference between refractive indexes of said polymeric particulate material and said adhesive binder is less than about 0.1.

10. The tape or strip of claim 1, wherein said shell has a glass transition temperature of higher than about 45° C.

11. The tape or strip of claim 1, wherein said core is refractive index matched to the shell or a blend of the shell and the adhesive binder.

12. The tape or strip of claim 1, wherein said inorganic particulate material is $CaCO_3$, $BaSO_4$, silica, glass beads, bentonite, or clay.

13. The tape or strip of claim 1, wherein said inorganic particulate material takes up about 1 to about 20% by weight of the adhesive layer.

14. The tape or strip of claim 1, wherein said inorganic particulate material takes up about 3 to about 15% by weight of the adhesive layer.

15. The tape or strip of claim 1, wherein said adhesive layer further comprising an organic particulate material.

16. The tape or strip of claim 15, wherein said organic particulate material is a latex material, organic crystals or a solid plasticizer.

17. The tape or strip of claim 1, wherein said adhesive layer further comprising a second inorganic particulate material.

18. The tape or strip of claim 17, wherein said first and second inorganic particulate materials are independently $CaCO_3$, $BaSO_4$, silica, glass beads, bentonite, or clay.

19. The tape or strip of claim 17, wherein the total concentration of said inorganic particulate material and said second inorganic particulate material is about 5 to about 50% by weight.

20. The tape or strip of claim 1, wherein said adhesive layer further comprising a solid plasticizer.

* * * * *